(12) United States Patent
Futumoto et al.

(10) Patent No.: US 9,099,113 B1
(45) Date of Patent: Aug. 4, 2015

(54) SLIDER WITH SPIN-TORQUE OSCILLATOR (STO) AND STO CORROSION MONITOR

(71) Applicant: HGST Netherlands B.V., Amsterdam (NL)

(72) Inventors: Takayuki Futumoto, Fujisawa (JP); Osamu Tonomura, Fujisawa (JP); Yuta Udo, Odawara (JP); Tsutomu Yadori, Odawara (JP); Hideo Yamakura, Yokohama (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/542,555

(22) Filed: Nov. 15, 2014

(51) Int. Cl.
*G11B 5/35* (2006.01)
*G11B 5/31* (2006.01)

(52) U.S. Cl.
CPC .............. *G11B 5/314* (2013.01); *G11B 5/3133* (2013.01)

(58) Field of Classification Search
CPC .......... G11B 2005/0024; G11B 5/314; G11B 5/1278; G11B 5/3133; G11B 2005/0005; G11B 5/3116; G11B 2005/3996; G11B 5/23
USPC ....................... 360/125.3, 128, 122
See application file for complete search history.

(56) References Cited

U.S. PATENT DOCUMENTS

| | | | |
|---|---|---|---|
| 8,072,711 B1 * | 12/2011 | Wang ............................ | 360/324 |
| 8,169,754 B2 * | 5/2012 | Druist et al. ................ | 360/324.2 |
| 8,792,311 B2 * | 7/2014 | Zheng et al. ................ | 369/13.33 |
| 8,867,176 B1 * | 10/2014 | Nibarger et al. ........... | 360/324.1 |
| 8,908,483 B1 * | 12/2014 | Ren et al. ..................... | 369/13.33 |
| 8,937,853 B2 * | 1/2015 | Zheng et al. ................ | 369/13.26 |
| 2009/0080120 A1 * | 3/2009 | Funayama et al. ............. | 360/319 |
| 2009/0201614 A1 * | 8/2009 | Kudo et al. .............. | 360/324.11 |
| 2009/0244753 A1 * | 10/2009 | Yoshinami ...................... | 360/31 |
| 2010/0134922 A1 * | 6/2010 | Yamada et al. ........... | 360/123.01 |
| 2011/0242701 A1 * | 10/2011 | Ohtake et al. .............. | 360/99.08 |
| 2012/0075752 A1 * | 3/2012 | Sato et al. ..................... | 360/324 |
| 2012/0250180 A1 * | 10/2012 | Mizushima et al. ............ | 360/75 |
| 2013/0028058 A1 * | 1/2013 | Yasui et al. ................. | 369/13.14 |
| 2014/0063648 A1 | 3/2014 | Shiroishi et al. | |
| 2015/0043106 A1 * | 2/2015 | Yamada et al. .......... | 360/123.05 |

* cited by examiner

*Primary Examiner* — Will J Klimowicz
(74) *Attorney, Agent, or Firm* — Thomas R. Berthold

(57) ABSTRACT

A disk drive slider supports a microwave-assisted magnetic recording (MAMR) write head with a spin-torque oscillator (STO) and a separate corrosion monitor (CM). The CM includes a corrosion detection layer formed of the same material as the STO's spacer layer. The CM is coplanar with the STO but laterally spaced from the STO. The corrosion detection layer has an edge at the ABS so as to be exposed to the same atmospheric conditions as the STO's spacer layer. Electrical leads are located at the ends of the CM and are electrically connected to pads on the upper surface of the slider. Electrical resistance of the CM is measured by detection of current in the plane of the corrosion detection layer.

13 Claims, 5 Drawing Sheets

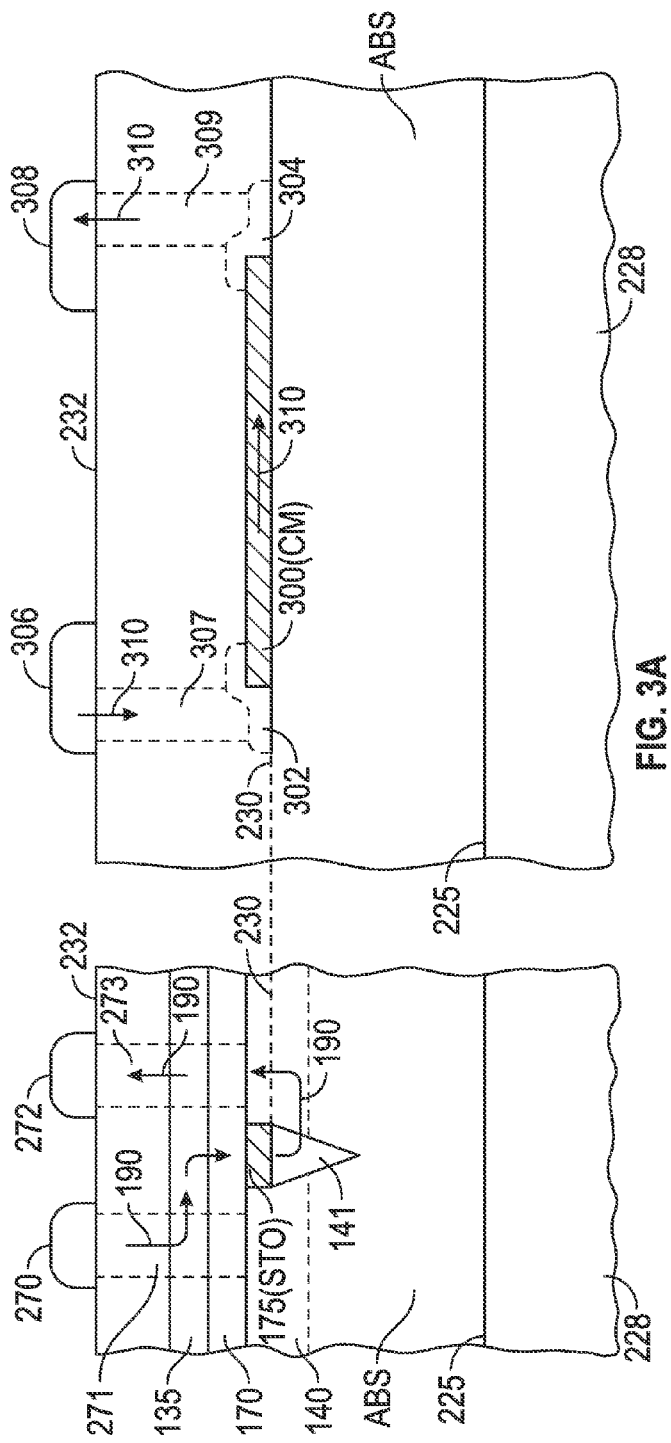
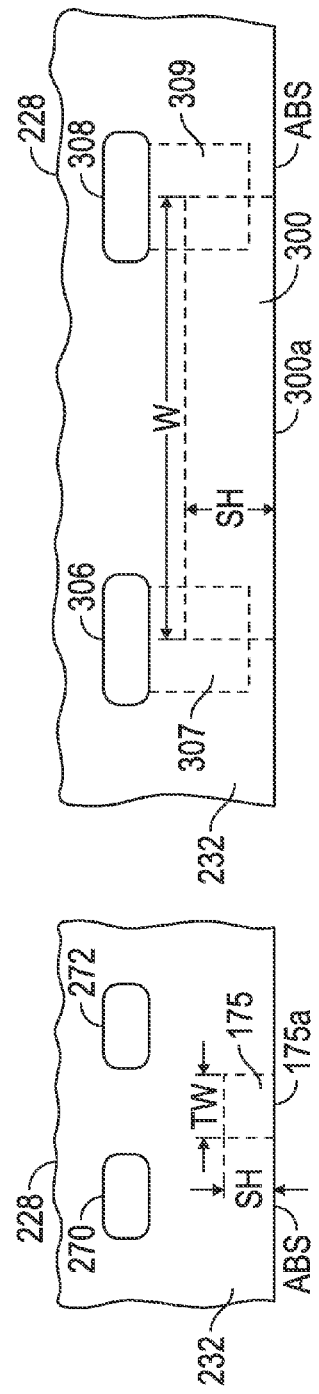
FIG. 3A
FIG. 3B

SLIDER WITH SPIN-TORQUE OSCILLATOR (STO) AND STO CORROSION MONITOR

BACKGROUND OF THE INVENTION

1. Field of the Invention

This invention relates generally to magnetic recording systems, and more particularly to a write head with a spin-torque oscillator (STO) that provides microwave-assisted magnetic recording (MAMR).

2. Description of the Related Art

Perpendicular magnetic recording (PMR) in magnetic recording hard disk drives, wherein the recorded bits are stored in a perpendicular or out-of-plane orientation in the magnetic recording layer of the disk, allows for ultra-high recording density, i.e., the areal density of the recorded bits on the disk. However, an increase in recording density requires a corresponding reduction in the size of the magnetic grains in the magnetic recording layer to achieve sufficient medium signal-to-noise ratio. As the size of the magnetic grains is reduced, the magnetocrystalline anisotropy of the magnetic grains must be increased to maintain adequate thermal stability. Simultaneously, the magnetic write field from the write head has to exceed the coercivity of the magnetic recording layer to achieve saturation digital recording, resulting in a conflicted limitation on the anisotropy of the magnetic grains.

A PMR system with high-frequency assisted writing using a spin-torque oscillator (STO) has been proposed. This type of recording, also called microwave-assisted magnetic recording (MAMR), applies a high frequency oscillatory auxiliary magnetic field from the STO to the magnetic grains of the recording layer. The auxiliary field may have a frequency close to the resonance frequency of the magnetic grains in the recording layer to facilitate the switching of the magnetization of the grains at lower write fields from the conventional write head than would otherwise be possible without assisted recording. Conversely, MAMR may be used to increase the coercivity of the magnetic recording layer above that which could be written to by a conventional write head alone. The increase in coercivity afforded by MAMR allows for a reduction in the size of the magnetic grains and thus a corresponding increase in recording density. MAMR systems are described in U.S. Pat. No. 6,785,092 B2; US 2008/0137224 A1; and by J. G. Zhu et al., "Microwave Assisted Magnetic Recording", *IEEE Transactions on Magnetics*, Vol. 44, No. 1, January 2008, pp. 125-131.

In proposed MAMR write heads, the STO is located on the head carrier or slider between the write pole and the trailing magnetic shield. The STO is a multilayer film stack made up of two or more magnetic layers separated by a nonmagnetic electrically conductive spacer layer, which is typically copper (Cu). One of the magnetic layers, the field generating layer (FGL), is designed to have its magnetization orientation oscillate in the presence of a direct electrical current perpendicular to the film planes of the film stack. In the presence of current above a critical current density, another magnetic layer, referred to as the reference layer and whose magnetization orientation preferably does not oscillate, acts as the "spin-polarizer" to produce a spin-polarized current at the FGL. This destabilizes the static equilibrium of the FGL's magnetization orientation, causing it to undergo sustained oscillation at frequencies useful for MAMR applications.

The STO Cu spacer layer is susceptible to corrosion, which can occur when the air-bearing surface (ABS) of the slider is exposed to the atmosphere and the Cu oxidizes. The electrical contacts for the STO are above and below the STO because the current is directed perpendicularly through the planes of the STO layers. Thus a method for detecting corrosion by measuring the electrical resistance of the STO using the existing electrical contacts is not reliable because the spacer layer is so thin that the resistance value and change in resistance is too small. Also, the small size and location of the STO in the MAMR head makes it difficult to reliably detect corrosion by imaging the STO using scanning electron microscopy (SEM).

Because it is important during high volume production of sliders with MAMR heads to be able to identify those that have unacceptable levels of STO corrosion, a reliable STO corrosion detection system and method is essential.

SUMMARY OF THE INVENTION

Embodiments of the invention relate to a disk drive slider that supports a microwave-assisted magnetic recording (MAMR) write head with a spin-torque oscillator (STO) and a separate corrosion monitor (CM). The CM includes a corrosion detection layer formed of the same material as the STO's spacer layer. The CM is preferably located on the slider so as to be coplanar with the STO but laterally spaced from the STO so as to be away from the MAMR write head. The corrosion detection layer preferably has an edge at the ABS so as to be exposed to the same atmospheric conditions as the STO's spacer layer. Electrical leads are located at the ends of the CM and are electrically connected to pads on the upper surface of the slider. Electrical resistance of the CM is measured by detection of current in the plane of the corrosion detection layer. The corrosion detection layer is also substantially wider than the spacer layer. Thus the resistance of the CM measured in the plane of the CM is much higher than the resistance of the STO measured perpendicular to the plane of the STO, which makes it easier to detect small changes in resistance that may be caused by corrosion.

For a fuller understanding of the nature and advantages of the present invention, reference should be made to the following detailed description taken together with the accompanying figures.

BRIEF DESCRIPTION OF THE DRAWING

FIG. 3A is a view of the air-bearing surface (ABS) of a slider according to an embodiment of the invention.

FIG. 3B is a view of the upper surface of a slider according to an embodiment of the invention.

DETAILED DESCRIPTION OF THE INVENTION

Figure 1:
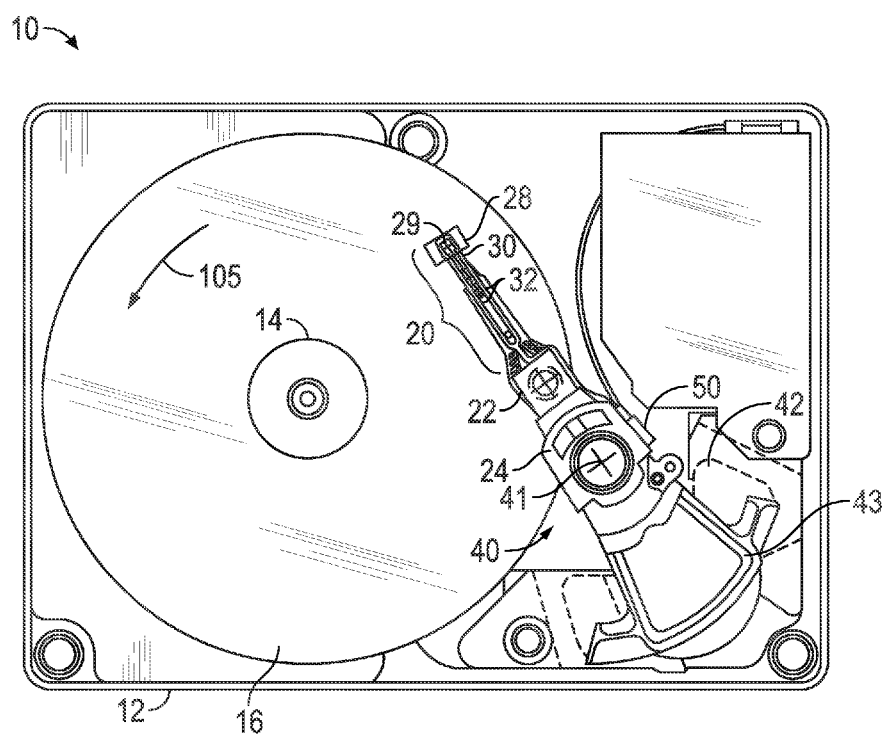
FIG. 1 is a top plan view of a hard disk drive with the cover removed for use with a microwave-assisted magnetic recording (MAMR) write head according to the prior art.

FIG. 1 is a top plan view of a hard disk drive 10 with the cover removed for use with a microwave-assisted magnetic recording (MAMR) write head. The disk drive 10 includes a rigid base 12 supporting a spindle 14 that supports a stack of disks, including top disk 16. The spindle 14 is rotated by a spindle motor (not shown) for rotating the disks in the direction shown by curved arrow 105. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to an air-bearing slider 28. A magnetic recording read/write head 29 is located at the end or trailing surface of slider 28, which serves as the head carrier. The flexure 30 enables the slider 28 to "pitch" and "roll" on an air-bearing generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2A:
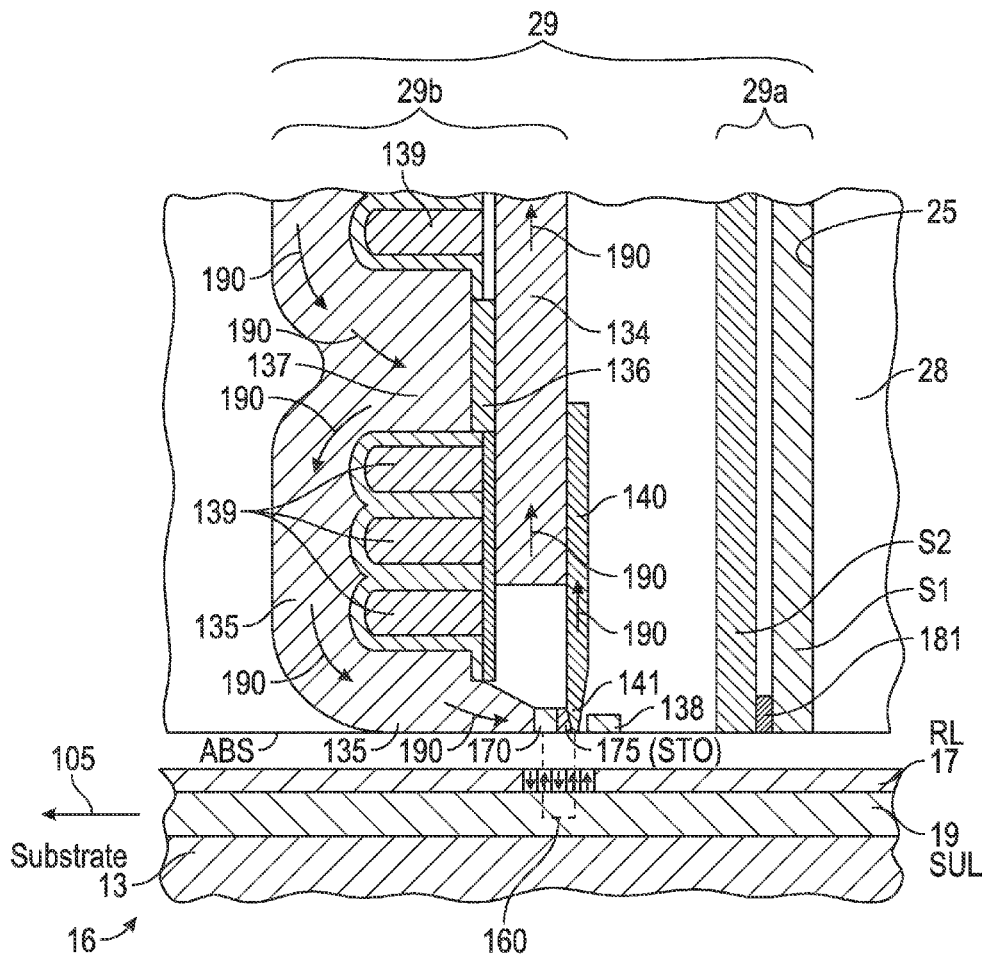
FIG. 2A is a side sectional view of a prior art perpendicular MAMR write head, a read head and a recording disk taken through a central plane that intersects a data track on the disk.

FIG. 2A is a side sectional view of a prior art perpendicular MAMR write head, read head and a recording disk taken through a central plane that intersects a data track on the disk. As shown in FIG. 2A, the disk may be a "dual-layer" disk 16 that includes a perpendicular magnetic data recording layer (RL) 17 and a "soft" or relatively low-coercivity magnetically permeable underlayer (SUL) 19 formed on the disk substrate 13. A non-magnetic interlayer (not shown) is typically stacked between the RL and SUL. The read/write head 29 is typically formed as a series of thin films deposited on a trailing surface 25 of air-bearing slider 28 that has its air-bearing surface (ABS) supported above the surface of disk 16. The slider is typically formed of an alumina/titanium-carbide composite material. The read/write head 29 includes magnetoresistive (MR) read head 29a and MAMR write head 29b. The MR read head 29a is comprised of MR sensor 181 located between magnetic shields S1 and S2 and is deposited on the trailing surface 25 of the slider 28 prior to the deposition of the layers making up the MAMR write head 29b.

The MAMR write head 29b is a single write pole type of perpendicular magnetic recording (PMR) write head and includes a yoke structure with main pole 134 that includes write pole (WP) 140 with pole tip 141, flux return pole 135, trailing magnetic shield 170, and yoke stud 137 that connects the main pole 134 and return pole 135. The MAMR write head 29b may also include a leading shield 138 at the ABS. The main pole 134, write pole 140, return pole 135, trailing shield 170 and leading shield 138 are formed of a ferromagnetic alloy, typically a NiFe, CoFe or NiFeCo alloy. An electrically insulating layer 136 is located between the yoke stud 137 and the main pole 134. The STO 175 is located substantially at the ABS between the trailing shield 170 and write pole tip 141. The write head 29b also includes a thin film coil, a section of which is shown in sections as coil 139 between the return pole 135 and the main pole 134. The write coil 139 is a "pancake" coil in which all the coil sections are in substantially the same plane and wrapped around the yoke stud 137, but alternatively the coil may be a helical coil wrapped around mail pole 134. The WP 140 is part of the main pole 134 and has a pole tip 141 substantially at the ABS that faces the outer surface of disk 16. Write current through coil 139 induces a magnetic field (shown by dashed line 160) from the WP tip 141 that passes through the RL 16 (to magnetize the region of the RL 16 beneath the WP tip 141), through the flux return path provided by the SUL 19, and back to the return pole 135. At the same time as the write field is applied to the RL 17, the STO 175 applies an auxiliary AC field to the RL 17. This results in microwave-assisted magnetic recording (MAMR), which improves the switching of the magnetization of the grains in the RL 17. The RL 17 is illustrated with perpendicularly recorded or magnetized regions, with adjacent regions having opposite magnetization directions, as represented by the arrows. The magnetic transitions between adjacent oppositely-directed magnetized regions are detectable by the MR sensor 181 as the recorded bits.

Figure 2B:
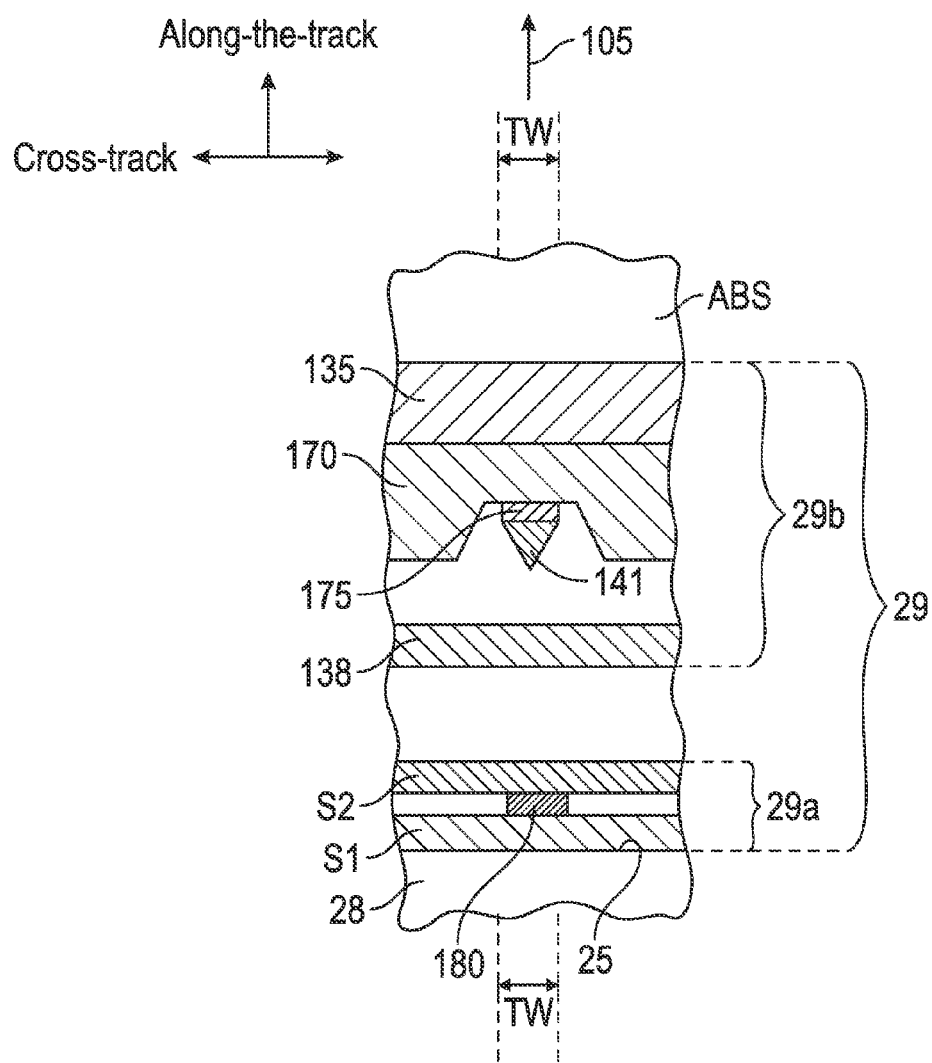
FIG. 2B is a view of the read/write head of FIG. 2A as seen from the disk.

FIG. 2B illustrates the read/write head 29 as seen from the disk 16. The ABS is the recording-layer-facing surface of the slider 28 that is generally orthogonal to the trailing surface 25 and is shown without the thin protective overcoat typically present in an actual slider. The recording-layer-facing surface shall mean the surface of the slider 28 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The disk 16 (FIG. 2A) moves relative to the read/write head 29 in the direction 105, which is called the along-the-track direction. The direction perpendicular to direction 105 and parallel to the plane of the ABS is called the cross-track direction. The width of the WP tip 141 in the cross-track direction substantially defines the track-width (TW) of the data tracks in the RL 17 (FIG. 2A). The TS 170 alters the angle of the write field as well as its gradient, and makes writing more efficient.

The spin-torque-oscillator (STO) 175 of the MAMR write head is located between the trailing shield 170 and the WP tip 141. The STO 175 is a multilayer film stack made up of two or more magnetic layers separated by a nonmagnetic electrically conductive spacer layer, which is typically copper (Cu). STOs for MAMR are described, for example, in U.S. Pat. No. 7,982,996 B2 and US 2013/0083423 A1 and by J. G. Zhu et al., "Microwave Assisted Magnetic Recording", *IEEE Transactions on Magnetics*, Vol. 44, No. 1, January 2008, pp. 125-131. The electrical current source for the STO 175 is not shown but includes leads connected to the return pole 135 and the main pole 134. The electrical current passes perpendicularly through the layers making up the STO 175. As shown by arrows 190 (FIG. 2A), the electrical circuit for supplying current to the STO 175 includes the return pole 135, trailing shield 170, WP tip 141, WP 140 and main pole 134. The insulating layer 136 between the yoke stud 137 and the main pole 134 assures that current is not shorted between the return pole 135 and the main pole 134.

The STO's electrically conductive spacer layer, which is typically copper (Cu), is susceptible to corrosion, which can occur when the ABS of the slider is exposed to the atmosphere and the Cu oxidizes. A method for detecting corrosion by measuring the electrical resistance of the STO using the existing electrical leads is not reliable because the spacer layer is so thin that the resistance value and change in resistance is too small when measured perpendicularly across the STO. Also, the small size and location of the STO in the MAMR head makes it difficult to reliably detect corrosion by imaging the STO using scanning electron microscopy (SEM). While Cu is the preferred material for the spacer layer, other alternative materials include a Cu alloy like CuZn, CuSn, CuAl, and CuNi.

Embodiments of this invention relate to a slider that includes a separate corrosion monitor (CM). The CM includes a corrosion detection layer formed of the same material as the STO's spacer layer. The CM is preferably located on the slider so as to be coplanar with the STO but laterally spaced from the STO so as to be away from the MAMR write head. The corrosion detection layer preferably has an edge at the ABS so as to be exposed to the same atmospheric conditions as the STO's spacer layer. Electrical leads are located at the ends of the CM and are electrically connected to pads on the upper surface of the slider. Electrical resistance of the CM is measured by detection of current in the plane of the corrosion detection layer. The corrosion detection layer is also substantially wider than the spacer layer. Thus the resistance of the CM measured in the plane of the CM is much higher than the resistance of the STO measured perpendicular to the plane of the STO, which makes it easier to detect small changes in resistance that may be caused by corrosion.

FIG. 3A is a view of the ABS and FIG. 3B is a view of the upper surface of a slider according to an embodiment of the invention. Slider 228, which is typically formed of an alumina/titanium-carbide composite material, has a trailing surface 225 onto which all of the layers making up the MAMR write head and MR read head are sequentially deposited and patterned (the MR head is not shown for ease of illustration). As explained with respect to FIG. 2A and as shown by arrows 190, the electrical circuit for supplying current to the STO 175 is made by contact pad 270 on the slider's upper surface 232 through electrically conductive via 271, return pole 135, trailing shield 170, and back through WP tip 141, WP 140, and electrically conductive via 273 to contact pad 272 on the upper surface 232.

The CM 300 is located on slider 228 on surface 230 above the trailing surface 225. Surface 230 is an intermediate surface parallel to the trailing surface 225 and between the trailing surface 225 and the upper surface 232. Surface 230 is preferably the same surface as the surface onto which the STO 175 is formed, so that the STO 175 and CM 300 are substantially coplanar. CM 300 is spaced laterally away from the STO 175 on surface 230 so as to be away from the MAMR write head. The CM 300 has a first lead 302 connected to one end and a second lead 304 connected at the other end. The leads 302, 304 are connected to electrical contact pads 306, 308, respectively, located on the slider's upper surface 232 by way of electrically conductive vias 307, 309, respectively. As shown by arrows 310, the in-plane electrical resistance of CM 300 is measured by directing current between the two contact pads 306, 308. As shown in FIG. 3B, the STO 175 has an edge 175a at the ABS and the CM 300 has an edge 300a at the ABS.

Typical dimensions for the STO are a trackwidth (TW) in the range of about 40 to 100 nm and a stripe height (SH) in the range of about 30 to 100 nm, with a thickness in the range of about 10 to 40 nm. In contrast, the CM has a width (W) in the range of about 0.5 to 10 microns (about 10 to 200 times the TW and preferably at least 10 times the TW) and a stripe height of about 100 to 300 nm, with a thickness preferably the same as the thickness of the STO. With these dimensions and conventional materials for the STO, the STO will have a resistance in the range of about 10 to 80 ohms measured perpendicularly to the STO while the CM will have a resistance in the range of about 50 to 1000 ohms measured in the plane of the CM. With this rather large resistance for the CM, small changes in resistance due to corrosion of the CM can be easily detected.

Figure 4:
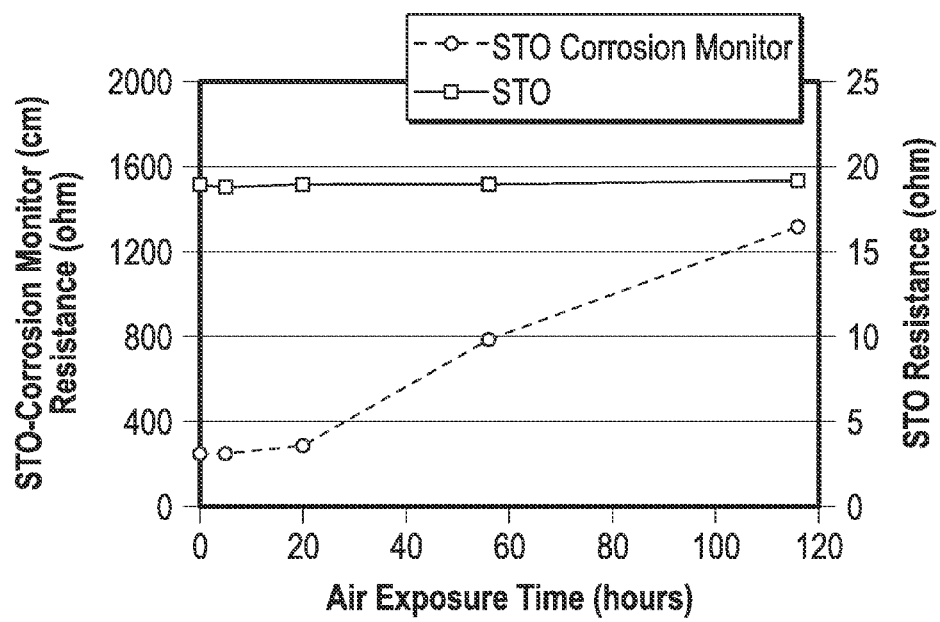
FIG. 4 is a graph of spin-torque oscillator (STO) resistance and corrosion monitor (CM) resistance as a function of air exposure time.

FIG. 4 is a graph of STO resistance and CM resistance as a function of air exposure time. The STO resistance measured perpendicularly to the plane of the STO is essentially constant at about 18 ohms as air exposure increases up to about 120 hours, which would indicate there has been no corrosion. However, the CM resistance measured in the plane of the CM increases from about 300 ohms to about 1300 ohms after about 120 hours, indicating a generally linear increase in corrosion over time. Thus it is apparent that the measured resistance perpendicular to the plane of the STO is an unreliable indicator of corrosion.

Figure 5:
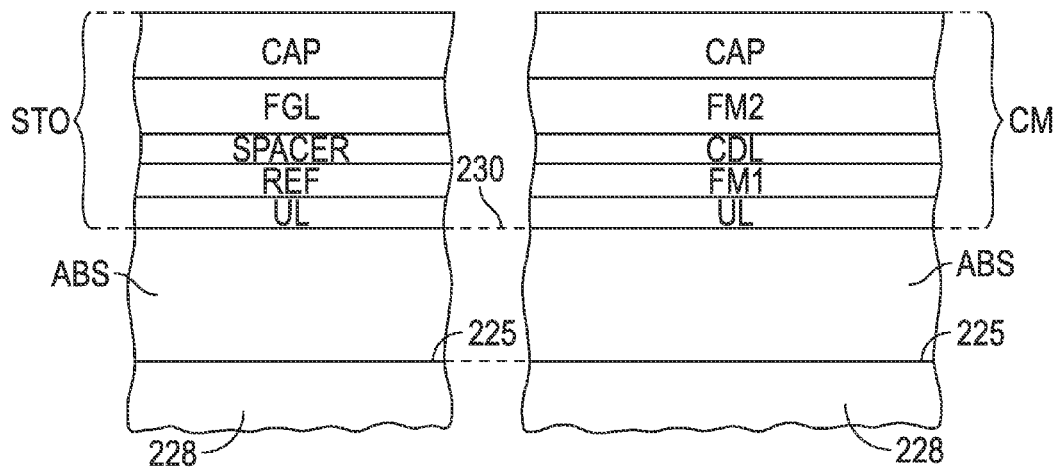
FIG. 5 is a view of a portion of the slider ABS illustrating the layers making up the STO and the CM according to an embodiment of the invention.

FIG. 5 is a view of a portion of the slider ABS illustrating the layers making up the STO and the CM. In the preferred embodiment all of the layers in the CM are identical to corresponding layers in the STO. The STO layers include an underlayer (UL), a ferromagnetic reference layer (REF), the electrically conductive spacer layer, the ferromagnetic flux generating layer (FGL) and a nonmagnetic capping layer (CAP). The corresponding layers in the CM are identical in composition and thickness to the layers in the STO and thus include a UL, a first ferromagnetic layer (FM1), a corrosion detection layer (CDL), a second ferromagnetic layer (FM2) and a capping layer (CAP). This is because the layers are deposited as a full film on slider surface 230 and then patterned and etched to define the TW and SH of the STO and the width (W) and SH of the CM.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A slider having a trailing surface, a plurality of layers on the trailing surface, an upper surface substantially parallel to the trailing surface and an air-bearing surface (ABS) substantially orthogonal to the trailing surface, the slider comprising:
    a write head on the trailing surface including a write pole and a trailing shield;
    a spin torque oscillator (STO) between the write sole and the trailing shield, the STO having an electrically conductive spacer layer adapted to receive electrical current in a direction orthogonal to the plane of the spacer layer;
    a corrosion monitor (CM) on the trailing surface and laterally spaced from the STO so as to not be located between the write pole and the trailing shield, the CM having a corrosion detection layer formed of the same material as said spacer layer;
    a first electrically conductive lead connected to a first end of the corrosion detection layer;
    a second electrically conductive lead connected to a second end of the corrosion detection layer, the first and second leads adapted to direct electrical current between the first and second ends of the corrosion detection layer in a direction parallel to the plane of the corrosion detection layer;
    a first contact pad on the upper surface of the slider and electrically connected to said first lead; and
    a second contact pad on the upper surface of the slider and electrically connected to said second lead.

2. The slider of claim 1 wherein the CM is substantially coplanar with the STO.

3. The slider of claim 1 wherein the corrosion detection layer has a thickness substantially the same as the thickness of said spacer layer.

4. The slider of claim 1 wherein said spacer layer has an edge substantially at the ABS and said corrosion detection layer has an edge substantially at the ABS.

5. The slider of claim 4 wherein said corrosion detection layer edge has a width at least 10 times the width of said spacer layer edge.

6. The slider of claim 1 wherein the STO includes a ferromagnetic reference layer and a ferromagnetic field generating layer (FGL) and said spacer layer is located between said reference and FGL layers, and wherein the CM includes a first ferromagnetic layer formed of the same material as said reference layer and a second ferromagnetic layer formed of the same material as said FGL layer and wherein the corrosion detection layer is located between said first and second ferromagnetic layers.

7. The slider of claim 1 wherein said spacer layer is formed of a material selected from Cu, CuZn, CuSn, CuAl and CuNi.

8. The slider of claim 7 wherein the spacer layer material consists of Cu.

9. The slider of claim 1 further comprising a first electrically conductive via connecting said first contact pad on the upper surface to said first lead and a second electrically conductive via connecting said second contact pad on the upper surface to said second lead.

10. A slider having a trailing surface, an upper surface parallel to the trailing surface, an intermediate surface parallel to the trailing surface and between the trailing surface and the upper surface, and an air-bearing surface (ABS) substantially orthogonal to the trailing surface, the slider comprising:
   a spin torque oscillator (STO) on the intermediate surface, the STO having an electrically conductive spacer layer having an edge at the ABS;
   a corrosion monitor (CM) on the intermediate surface and laterally spaced from the STO, the CM having a corrosion detection layer formed of the same material as said spacer layer and having an edge at the ABS with a width at least 10 times the width of said spacer layer edge;
   a first electrically conductive lead connected to a first end of the CM;
   a second electrically conductive lead connected to a second end of the CM;
   a first contact pad on the upper surface of the slider and electrically connected to said first lead; and
   a second contact pad on the upper surface of the slider and electrically connected to said second lead.

11. The slider of claim 10 wherein the corrosion detection layer has a thickness substantially the same as the thickness of said spacer layer.

12. The slider of claim 10 wherein the STO includes a ferromagnetic reference layer and a ferromagnetic field generating layer (FGL) and said spacer layer is located between said reference and FGL layers, and wherein the CM includes a first ferromagnetic layer formed of the same material as said reference layer and a second ferromagnetic layer formed of the same material as said FGL layer and wherein the corrosion detection layer is located between said first and second ferromagnetic layers.

13. The slider of claim 10 wherein said spacer layer is formed of a material selected from Cu, CuZn, CuSn, CuAl and CuNi.

* * * * *